United States Patent [19]

Barz

[11] 4,136,470

[45] Jan. 30, 1979

[54] QUICK CHANGE PICTURE FRAME

[76] Inventor: Benno Barz, Gienanthstrasse 10, D-6750 Kaiserslautern, Fed. Rep. of Germany

[21] Appl. No.: 739,738

[22] Filed: Nov. 8, 1976

[30] Foreign Application Priority Data

Nov. 14, 1975 [DE] Fed. Rep. of Germany ....... 2551302

[51] Int. Cl.² ............................................. G09F 1/12
[52] U.S. Cl. ...................................................... 40/152
[58] Field of Search ...................... 40/152, 152.1, 155; 403/401, 402

[56] References Cited

U.S. PATENT DOCUMENTS

| | | | |
|---|---|---|---|
| 2,581,843 | 1/1952 | Edwards | 40/156 X |
| 3,294,430 | 12/1966 | Halip | 40/152 |
| 3,312,008 | 4/1967 | Yarder | 40/155 X |
| 3,955,298 | 5/1976 | Kapstad | 40/152 |
| 3,990,168 | 11/1976 | Murray | 40/152 |

FOREIGN PATENT DOCUMENTS 2046434  9/1970  Fed. Rep. of Germany ........... 403/402

*Primary Examiner*—Russell R. Kinsey
*Assistant Examiner*—Wenceslao J. Contreras
*Attorney, Agent, or Firm*—Martin A. Farber

[57] ABSTRACT

A quick change frame for pictures comprising frame moldings and corner joints for detachable connection of the latter together. The frame moldings are in the form of hollow rails with at least one opening arranged on each side in a frame molding side wall enclosing the cavity. The corner joints comprise angle pieces with the shape and size of the cross-section of angle arms corresponding to the frame moldings. On the angle arms there is at least one male detent part extending out of a plane of these arms. When the angle arm has been inserted into the cavity of the respective hollow rail the male detent part releasably snaps into the respective opening provided in the side wall.

11 Claims, 12 Drawing Figures

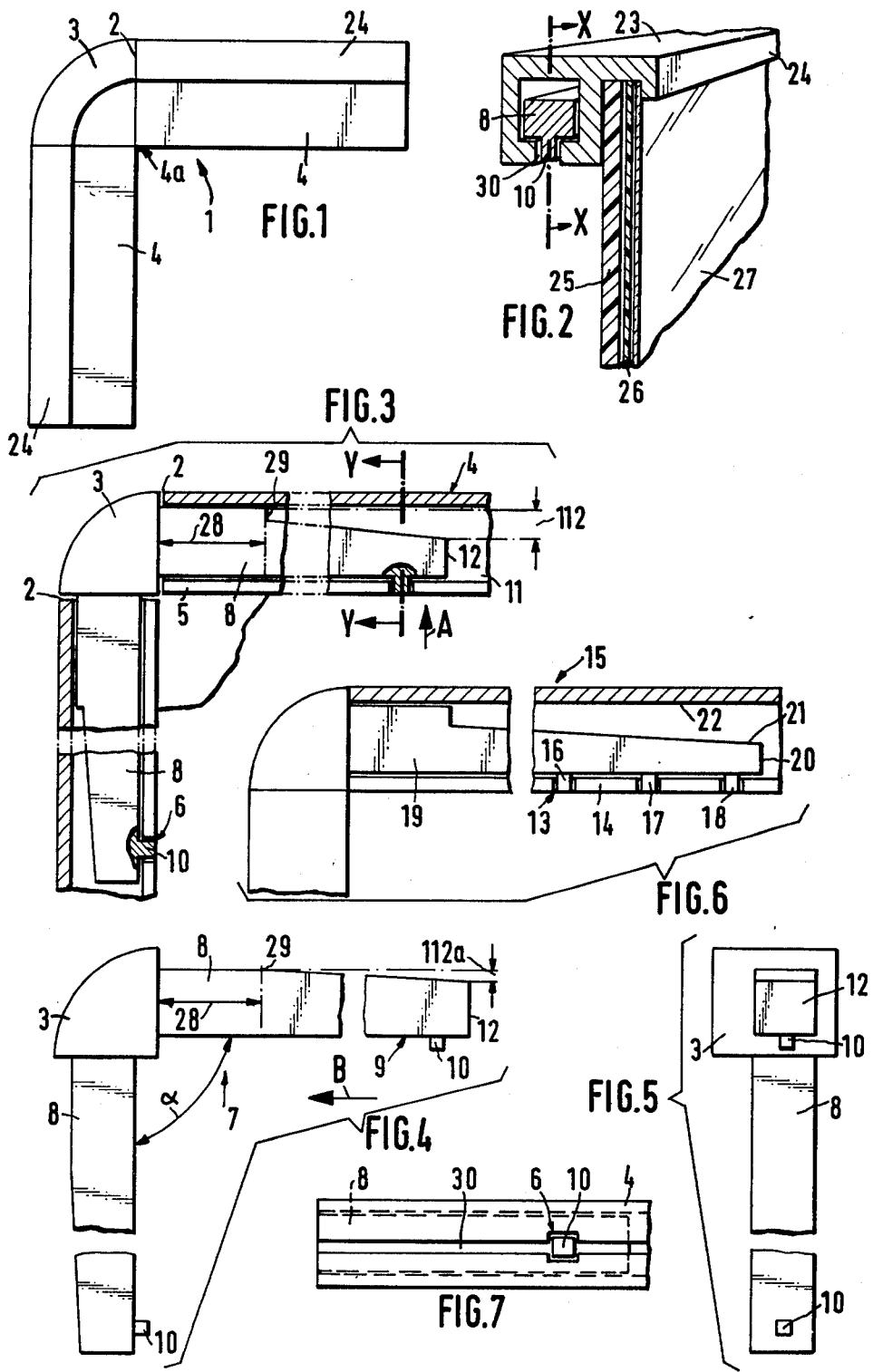

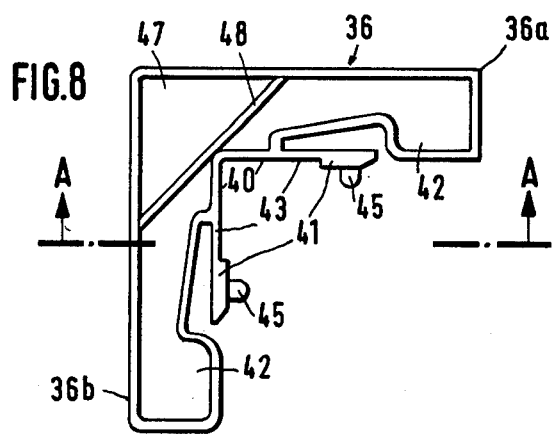
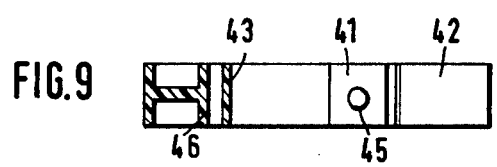
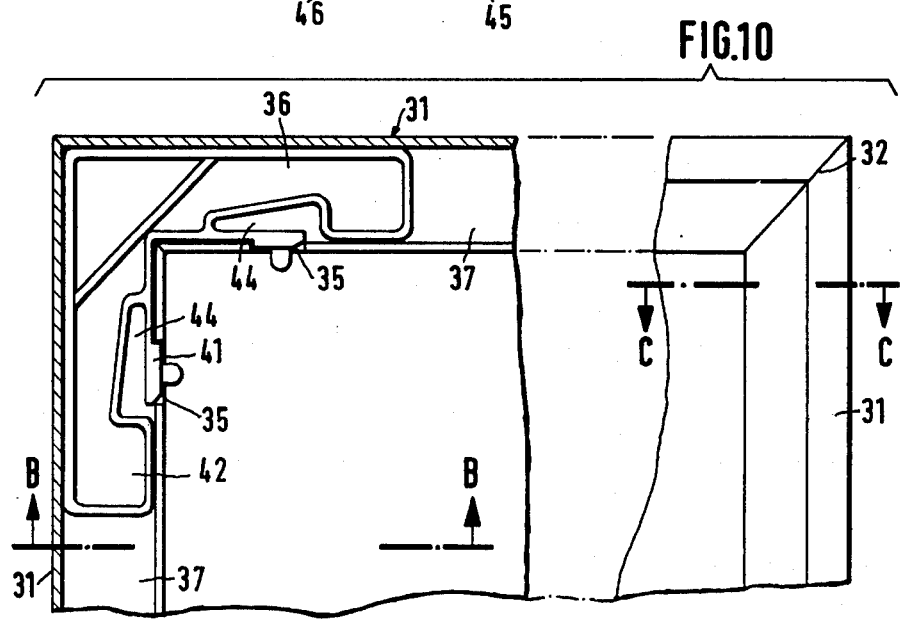
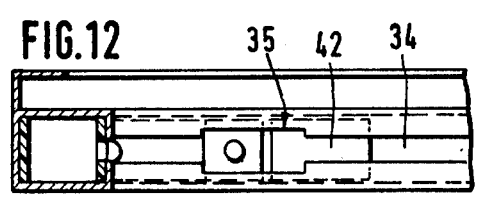
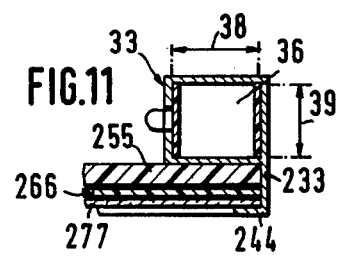

QUICK CHANGE PICTURE FRAME

The invention relates to a quick change picture frame consisting of frame moldings and corner connections for the detachable connection of the frame moldings with each other.

Quick change frames for pictures comprising frame moldings, which can be connected firmly with each other by means of screw, rotary or joint connections or the like have already been proposed. In the case of such corner connecting parts connected detachably or non-detachable with the frame moldings, the insertion of a picture is very complicated.

One aim of the invention is that of providing a quick change frame for pictures comprising frame moldings with corner connections by which the picture can be rapidly and simply placed in position by simple undoing the corner connections and can be replaced by another picture in the same simple manner. The quick change frame can compromise frame moldings with straight edges or with edges running together with a miter cut.

In accordance with the invention this is made possible in a quick change frame for pictures, comprising frame moldings and corner connections for detachable connection of the frame moldings with each other by the feature that the frame moldings are a hollow rail with at least one opening arranged extending through both sides in a frame molding web inner side wall adjacent to the cavity and the corner connections are angle pieces with corresponding in shape and size to the cross-section of the hollow rail of the frame moldings, and on these angle limbs at least one male detent part, projecting out of a plane of these inserts is provided, which, when the arms are inserted into the cavity of the respective hollow rail snaps into the opening arranged in the respective inner side wall.

Further features and advantages of the invention will be understood from the enclosed drawings which show an embodiment of the invention.

FIG. 1 shows a front view of a corner piece of a quick change frame with frame moldings with straight, that is square ends, FIG. 2 shows a part of a frame molding in perspective view on the section line Y—Y in accordance with FIG. 3.

FIG. 3 shows a view of a corner piece of a quick change frame in section on the section line X—X in accordance with FIG. 2.

FIG. 4 shows a corner connection for a quick change frame in front view.

FIG. 5 shows a corner connection for a quick change frame in side view looking in the direction of the arrow B in accordance with FIG. 4.

FIG. 6 shows a view of a corner piece of a quick change frame for long frame moldings, in section.

FIG. 7 shows a view looking in the direction of the arrow A of part of a frame molding in accordance with FIG. 3.

FIG. 8 shows a side view of another embodiment showing an angle piece connecting the frame moldings together.

FIG. 9 shows a section on the section line A—A of the corner piece in accordance with FIG. 8.

FIG. 10 shows a part of a quick change frame with oblique miter cut ends, in which one side of the frame is represented in section, showing the angle piece of FIG. 8, inserted into the cavity of the hollow rails, of the frame.

FIG. 11 is a sectional view in accordance with FIG. 10 on the section line C—C.

FIG. 12 is a sectional view in accordance with FIG. 10 on the section line B—B.

Referring now to the drawings and more particularly to FIGS. 1–7, FIG. 1 shows a view of part of a quick change frame in the corner zone 1, comprising frame moldings with straight, that is square cut ends 2 and corner connections 3 for the detachable fastening together of the frame moldings. The frame moldings comprise a hollow rail 4, in which, in a web part 5 thereof, a respective opening 6 is formed on each side adjacent to the straight or square cut ends 2 thereof. The corner connections 3 are constructed as an angle piece 7, on which plug or rail-like arms or inserts 8 are molded or arranged, on which a male detent part 10 is provided which projects out of the plane or surface 9. In this respect the respective openings 6 are so dimensioned with respect to the corresponding respective male detent part 10 that when the arms or inserts 8 are inserted into the hollow cavity 11 of the hollow rail 4, with a proper fit, the male detent parts 10 of the arms or inserts 8 snap into position detachably in the openings 6 arranged in the respective side web. The male detent parts 10 are cylindrical pins having sharp edges and constructed with a rectangular or square cross-section. These pins are attached so as to run perpendicularly with respect to the arms or insert 8 on the surface 9 of the latter facing the inner part of the picture. The openings 6 are also shaped in a corresponding manner so that the respective male detent part 10 can fit into same with an interlocking action. In order to press the part 10 out of the opening 6 inwardly into the cavity 11 after the part 10 has been snapped into position and to be able to pull the rail-like insert out from the cavity again, each insert 8 has a part 112 and 112a respectively extending inwardly tapered towards its free end 12 and 20 respectively. In order on the other hand to ensure that the male detent parts 10 can fit in position with some spring biasing effect into the openings and for increasing the pressing pressure the angle the two rails, arms or inserts 8 define an angle $\alpha$ between them somewhat less than 90° and preferably 87°.

In order to be able to give the frame the necessary joint rigidity and to hold the joints together properly even in the case of large dimensions, several openings 13 are provided in one side web 14 of a hollow rail 15 (FIG. 6) and accordingly the corresponding number of male detent parts 16 and 17 and, respectively, 18 are provided in proper relation to the openings 13 on the arms or inserts 19. In this case as well the inserts are tapered towards their free ends 20 in such a manner that the space between a hollow rail inner web 21 and a surface 22 adjacent to it of the arms or inserts 19 is so large that the arms or inserts can be raised or pressed up to such an extent that the male detent part 16 which is furthest removed from the tapering part can still be raised clear of the opening 13. Due to this construction of the arms or inserts a particularly high degree of rigidity is guaranteed in large frame components. In order to use these corner joints for smaller frames, in the case of which the dimensions of the cavity of the hollow rails are all the same, the arms or inserts only need to be shortened in their lengths if required. An outer web 23 (FIG. 2) of the hollow rail is extended in each case beyond the rail body and at its free end has a bent part 24, running substantially parallel to the body of the rail, on the picture side. The space thus created between the hollow body 4 and the inner surface of the bent part 24 serves on the one hand for holding a panel 25 of plastic or plywood or the like as a backing plate to the rear, and as a rest for a picture 26 on the front and it also serves for holding in place a transparent cover 27 as for example a pane of glass, the picture 26 being held fast between the parts 25 and 27. Any necessary allowance for descrepancies in the thickness of the sheet-like parts, that is for example the back panel and the transparent cover, and the space, in which they are held between the hollow body and the cover 24 can be allowed for in a conventional manner by means of inlets or strip springs or the like. Preferably the hollow rails are not closed on all sides and on their sides adjacent to the picture have a continuous gap 30 (as seen in FIG. 7) enabling the respective hollow rail or the respective moldings of the frame to act resiliently for the particular purpose of holding the arms or inserts in the cavities of the hollow rails resiliently and not only in accordance with their corresponding shape. The hollow rails or frame moldings are preferably made of light alloy or a light metal such as aluminum. They can however also be made of plastic and it is also conceivable to make certain parts of the quick change frame of aluminum and other parts, such as the corner joints of plastic. In the latter case the inserts are inserted into the corner joints and are not integral with the corner joints as would be possible for example in the case of manufacture of these parts of metal as for example aluminum.

It should also be pointed out that for the satisfactory, close fitting insertion of the individual arms or inserts 8 into the hollow rails 4 and thus for ensuring rigid holding together of the frame moldings plugged in position without any possibility of movement therebetween, the arms or inserts should at their end part adjacent to the corner joints 3 or connected therewith, have a shape which is complementary to the shape of the cavity 11. Such a complementary shape should be provided for a reasonable portion 28 of the length. As a result the above tapering of the inserts only extends from the step end 29 of the part 28 of complementary shape up to the free end 12 or, respectively, 20 of the respective insert. It is also to be mentioned that the corner joints 3, at which the arms or inserts 8 with the shape of moldings are formed, simultaneously also form the filling pieces for the empty frame corners, produced by the straight or square edges, running together at the point 4a of abutment, of the hollow rails 4.

FIG. 10 shows in part view a quick change frame with frame moldings 31 with ends cut obliquely, that is to say to produce a miter 32. For connecting these frame moldings 31, also made up of a hollow rail 33 with a continuous gap 34 in one side web and recesses 35 — use is made of corner or angle pieces 36 (see FIGS. 8 and 9) whose two angle limbs 36a and 36b are inserted respectively into the ends of the hollow rails running together with a corresponding insertion into the recesses 35, as was the case with quick change frames with straight ends of the frame moldings. The corner pieces are complementary in shape to the cavity 37 so that the two angle arms 36a and 36b correspond substantially in their thickness to the height dimensions 38 and the breadth dimensions 39 of the interior of the cavity 37. If the cavity and the angle limbs are made round, the parts 36 and 37 correspond in relation to each other approximately equal in diameter. In any case the thickness of the angle piece 36 must be selected in relation to the interior dimensions of the cavity such that the former must be able to be inserted without play into the respective cavity in the frame and can be held in it with an accurate fit. The angle pieces have on the inner sides 40 a respective male detent part 41, and these parts fit into the recesses 35 of the hollow rail when the intended position (FIG. 10) has been assumed in the cavities. The two angle arms 36a and 36b have forwardly extended holding blocks 42, by means of which the inserted angle pieces and accordingly the whole corner joint is made substantially more rigid. The male detent part 41 is mounted on a tab 43 which can spring upwards and downwards and is preferably of integral construction with the angle piece. The front part of the tab is constructed as the male detent member 41 with a step so that it can snap into position in the complementary recess 35 and so that the angle arms 36a and 36b are retained against axial shifting in the cavity 37 and against any undoing of the frame moldings. In order to detach the male detent members from the respective recess and be able to detach the individual frame moldings from each other, above the tab a recess 44 is formed, into which recess the tab with its step 41 can be pressed in order to release the detent connection. Preferably for this purpose on the side facing outwards of the male detent member there is an outwardly extending push button 45 formed thereon.

The angle arms and accordingly the whole angle piece 36 are completely inserted in the interior of the hollow rails when the individual frame moldings are fitted together and are covered by the rails so that no outwardly extending joint parts — as is the case for example with the corner joints 3 as filling pieces for the empty corners — can obstruct the fitting together of the individual frame moldings with miter joints. The angle piece 36 is preferably made of plastic and has a double-T or H cross-section 46 (FIG. 9) and at the corner 47 is reinforced on both sides by a diagonal rib 48.

An outer web 233 of the hollow rail 33 is extended respectively beyond the rail 33 and at its free end has a bent part 244 directed towards the picture side. This space delimited between the hollow rail 33 and the bent part 244 serves for accommodating and holding a back panel 255 and a picture 266 and also a transparent cover 277.

I claim:

1. A quick change frame for pictures comprising frame moldings and corner joints for detachably fixing the frame moldings together, comprising frame moldings substantially closed tubular shaped in cross-section each forming a hollow rail having straight ends perpendicularly to the longitudinal axis of the hollow rail, the latter defining a cavity and having an inner side wall with at least one opening formed completely through said inner side wall adjacent each end thereof and adjacent to and communicating with the cavity, corner joints constituting angle pieces each including a central portion exposed between said straight ends of adjacent of said hollow rails, respectively and two angle arms attached to said central portion, each of said arms having a portion adjacent said central portion corresponding complementary in shape and size to the cross-section of the cavity of said hollow rail of said frame moldings, each of said arms includes at least one male detent part projecting out from said arms and releaseably snappingly inserted from said cavity of a respective of said hollow rail into said at least one opening in said inner side wall of said respective hollow rail, said two arms form an angle less than 90°.

2. The quick change frame in accordance with claim 1, wherein said angle is 87°.

3. A quick change frame for pictures comprising frame moldings and corner joints for detachably fixing the frame moldings together, comprising frame moldings substantially closed tubular shaped in cross-section each forming a hollow rail defining a cavity and having an inner side wall with at least one opening formed completely through said inner side wall adjacent each end thereof and adjacent to and communicating with the cavity, corner joints constituting angle pieces each including two angle arms, each of said arms having a portion corresponding complementary in shape and size to the cross-section of the cavity of said hollow rail of said frame moldings, each of said arms includes at least one male detent part projecting out from said arms and releaseably snappingly inserted from said cavity of a respective of said hollow rail into said at least one opening in said inner side wall of said respective hollow rail, said at least one opening constitutes several openings in each said inner side wall adjacent each end thereof, and said at least one male detent part constitutes a plurality of male detent parts on each said arm corresponding in relation to said several openings, each said arms tapers towards a free end thereof such that one of said male detent parts thereon furthest removed from the free end can be pressed out of a corresponding of said openings into said cavity for release.

4. A quick change frame for pictures comprising frame moldings and corner joints for detachably fixing the frame moldings together, comprising frame moldings substantially closed tubular shaped in cross-section each forming a hollow rail having straight ends perpendicularly to the longitudinal axis of the hollow rail, the latter defining a cavity and having an inner side wall with at least one opening formed completely through said inner side wall adjacent each end thereof and adjacent to and communicating with the cavity, corner joints constituting angle pieces each including a central portion exposed between said straight ends of adjacent of said hollow rails, respectively and two angle arms attached to said central portion, each of said arms having a portion adjacent said central portion corresponding complementary in shape and size to the cross-section of the cavity of said hollow rail of said frame moldings, each of said arms includes at least one male detent part projecting out from said arms and releaseably snappingly inserted from said cavity of a respective of said hollow rail into said at least one opening in said inner side wall of said respective hollow rail, said hollow rail includes, an outer side wall of said hollow rail extended along and rearwardly from said hollow rail and has a free end constituting a bent part running substantially parallel to said hollow rail and is directed towards a picture side of the frame.

5. A quick change frame for pictures comprising frame moldings and corner joints for detachably fixing the frame moldings together, comprising frame moldings substantially closed tubular shaped in cross-section each forming a hollow rail defining a cavity and having an inner side wall with at least one opening formed completely through said inner side wall adjacent each end thereof and adjacent to and communicating with the cavity, corner joints constituting angle pieces each including two angle arms, each of said arms has a portion corresponding complementary in shape and size to the cross-section of the cavity of said hollow rail of said frame moldings, each of said arms includes at least one male detent part projecting out from said arms and releaseably snappingly inserted from said cavity of a respective of said hollow rail into said at least one opening in said inner side wall of said respective hollow rail, said inner side wall of said hollow rail adjacent to a picture side is formed with portions defining therebetween a continuous longitudinal gap, said at least one opening constitutes an enlarged widened opening communicating with said longitudinal gap.

6. A quick change frame for pictures comprising frame moldings and corner joints for detachably fixing the frame moldings together, comprising frame moldings substantially closed tubular shaped in cross-section each forming a hollow rail defining a cavity and having an inner side wall with at least one opening formed completely through said inner side wall adjacent each end thereof and adjacent to and communicating with the cavity, corner joints constituting angle pieces each including two angle arms, each of said arms having a complementary portion corresponding complementary in shape and size to the cross-section of the cavity of said hollow rail of said frame moldings, each of said arms includes a longitudinal surface adjacent said inner side wall of said respective hollow rail, at least one male detent part projecting out from each of said arms on said longitudinal surface and releaseably snappingly inserted from said cavity of a respective of said hollow rail into said at least one opening in said inner side wall of said respective hollow rail, each of said hollow rails has an outer side wall spaced opposite from said inner side wall, each of said arms has a tapering part adjacent to said complementary portion, said tapering part has an inclined surface which extends from said complementary portion up to a free end of said each of said arms, said inclined surface is spaced from said inner side wall of said hollow rails, respectively.

7. A quick change frame for pictures comprising frame moldings and corner joints for detachably fixing the frame moldings together, comprising frame moldings substantially closed tubular shaped in cross-section each forming a hollow rail defining a cavity and having an inner side wall with at least one opening formed completely through said inner side wall adjacent each end thereof and adjacent to and communicating with the cavity, corner joints constituting angle pieces each having an enlarged central portion and including two angle arms, said angle arms are attached to said central portion and are smaller in cross-section than said central portion, each of said arms having a portion corresponding complementary in shape and size to the cross-section of the cavity of said hollow rail of said frame moldings, each of said arms includes at least one male detent part projecting out from said arms and releaseably snappingly engagingly inserted from said cavity of a respective of said hollow rail into said at least one opening in said inner side wall of said respective hollow rail, each said hollow rail of said frame moldings is formed with straight square cut ends extending perpendicularly to a longitudinal axis of said hollow rail, two adjacent said hollow rails are perpendicular to each other and substantially spaced apart yet contact each other only at an inner abutment point of adjacent of said square cut ends, respectively, of two adjacent of said hollow rails, said enlarged central portion of said corner joints are disposed complementary between said adjacent of said square cut ends, respectively, abutting the latter and forming an exposed corner part of the quick change frame between said adjacent square cut ends of said adjacent of said hollow rails constituting a filling piece.

8. The quick change frame in accordance with claim 7, wherein said at least one opening is dimensioned in relation to a respective of said at least one male detent part of each of said two arms such that when said two arms are inserted into the respective said cavity of the adjacent said hollow rails, said male detent part snaps releaseably into said opening in said inner side wall, respectively.

9. The quick change frame in accordance with claim 7, wherein each of said hollow rails has an outer side wall spaced opposite from said inner side wall, each of said arms is tapered towards a free end thereof in a direction towards said inner side at one inclined longitudinal surface of each said arms remote from said inner side wall, each of said arms has an inner longitudinal surface abutting said inner side wall, said one inclined longitudinal surface is spaced apart from said outer side wall of said hollow rails, respectively.

10. A quick change frame for pictures comprising frame moldings and corner joints for detachably fixing the frame moldings together, comprising frame moldings substantially closed tubular shaped in cross-section forming hollow rails each defining a cavity and having an inner side wall with at least one opening formed completely through said inner side wall adjacent each end thereof and adjacent to and communicating with the cavity, said cavity is square in cross-section, corner joints constituting angle pieces each including two angle arms, each of said arms corresponding in shape and size to the cross-section of the cavity of said hollow rails of said frame moldings, each of said arms includes at least one male detent part projecting out from said arms and releaseably snappingly inserted from said cavity of a respective of said hollow rails into said at least one opening in said inner side wall of the respective of said hollow rails, said ends of each said hollow rail are mitered ends, said angle pieces each have said two angle arms as said corner joints corresponding in thickness substantially to the height and breadth dimensions of said cavity and said arms are insertable completely into the latter, respectively, said angle pieces each further comprise, a holding block formed at a free end of each of said two angle arms complementary to said cavity, a resilient tab parallel to said inner side wall formed on each said angle arm, said at least one male detent part is formed on said tab, a push button formed on said male detent part, each of said arms is formed with a center portion having a H-shaped cross-section spaced from said tab defining a recess therebetween, said arms each include outer walls joined substantially perpendicularly to each other adjacent an outer corner of said mitered ends of perpendicularly abutting adjacent of said hollow rails, said two arms each include an inside side wall, respectively, having a common end connected to each other adjacent an inner corner of said mitered ends of perpendicularly abutting adjacent of said hollow rails, a diagonal rib connected to said outer walls of said two arms, respectively, and extending substantially perpendicularly to said mitered ends and abutting said inside side wall at said common end at a center of said diagonal rib, said tab extends from said inside side wall coplanarly therewith and has a free tab end spaced from said holding block.

11. The quick change frame as set forth in claim 10, wherein said inner side wall of said hollow rails is formed with a continuous longitudinal gap, said at least one opening constitutes an enlarged widened opening which communicates with said longitudinal gap.

* * * * *